United States Patent
Anchan et al.

(10) Patent No.: US 8,712,019 B2
(45) Date of Patent: Apr. 29, 2014

(54) APPARATUS AND METHOD FOR PERFORMING LAWFUL INTERCEPT IN GROUP CALLS

(75) Inventors: Kirankumar Anchan, San Diego, CA (US); Arvind V. Santhanam, San Diego, CA (US); Hamsini Bhaskaran, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 44 days.

(21) Appl. No.: 13/296,010

(22) Filed: Nov. 14, 2011

(65) Prior Publication Data

US 2013/0121480 A1 May 16, 2013

(51) Int. Cl.
*H04M 1/24* (2006.01)
*H04M 3/08* (2006.01)
*H04M 3/22* (2006.01)

(52) U.S. Cl.
USPC .......................................................... 379/35

(58) Field of Classification Search
USPC ...................... 379/7, 32.01, 32.04, 32.05, 35; 455/414.3, 416, 402.2, 410; 370/352–356
See application file for complete search history.

(56) References Cited

U.S. PATENT DOCUMENTS

| | | | |
|---|---|---|---|
| 5,913,161 A * | 6/1999 | Ozulkulu et al. ............. 455/405 |
| 6,870,905 B2 | 3/2005 | Pelaez et al. | |
| 7,283,521 B1 * | 10/2007 | Ryan ............................. 370/389 |
| 7,388,947 B2 * | 6/2008 | Smith et al. ..................... 379/35 |
| 7,620,708 B2 * | 11/2009 | Andreasen .................... 709/223 |
| 8,553,588 B2 * | 10/2013 | Jayaraman .................... 370/259 |
| 2004/0179513 A1 * | 9/2004 | Smith et al. ................... 370/352 |
| 2005/0076117 A1 * | 4/2005 | Hou et al. ...................... 709/224 |
| 2006/0072550 A1 * | 4/2006 | Davis et al. ................... 370/352 |
| 2006/0285649 A1 * | 12/2006 | Qian et al. .................. 379/32.01 |
| 2007/0041558 A1 | 2/2007 | Parayil et al. | |
| 2007/0287428 A1 * | 12/2007 | Diacakis et al. ........... 455/414.1 |
| 2008/0244702 A1 | 10/2008 | Kropivny | |
| 2009/0088139 A1 * | 4/2009 | Deubler et al. ............ 455/414.3 |
| 2010/0199189 A1 | 8/2010 | Ben-Aroya et al. | |
| 2011/0153809 A1 | 6/2011 | Ghanem et al. | |
| 2012/0250584 A1 * | 10/2012 | Jayaraman .................... 370/259 |

FOREIGN PATENT DOCUMENTS

WO 2004107719 A1 12/2004

OTHER PUBLICATIONS

Digital cellular telecommunications system (Phase 2+); Lawful Interception; Stage 1 (3GPP TS 42.033 version 7.0.0 Release 7); ETSI TS 142 033, IEEE, LIS, Sophia Antipolis Cedex, France, vol. 3-SA3, No. V7.0.O, Jun. 1, 2007, XP014038505, ISSN: 0000-0001.
International Search Report and Written Opinion—PCT/US2012/064895—ISA/EPO—Feb. 11, 2013.

* cited by examiner

Primary Examiner — Binh Tieu
(74) Attorney, Agent, or Firm — Raphael Freiwirth

(57) ABSTRACT

An apparatus and method for performing lawful intercept in group calls is described herein. When a group call is established having a monitoring target as a member, a monitoring component obtains signaling, location, and data related to the monitoring target, correlates this information, and provides it to a call intercept component.

33 Claims, 15 Drawing Sheets

APPARATUS AND METHOD FOR PERFORMING LAWFUL INTERCEPT IN GROUP CALLS

BACKGROUND

This application relates generally to lawful intercept, and more particularly, to performing near-real-time monitoring and reporting of intercepted communications in a group call setting.

The Communications Assistance for Law Enforcement Act (CALEA) is a United States wiretapping law to aid law enforcement in its effort to conduct criminal investigations requiring wiretapping of digital telephone networks. Existing implementations of a CALEA system typically only handle one-to-one calls, and do not work for group communications such as push-to-talk (PTT) and VoIP communications. Moreover, existing implementations deliver call signaling and call media (voice content) to the Law Enforcement Authority (LEA) across different paths, which often results in receiving this content at different times, making it difficult or impossible to correlate. Further, the different network components required for delivering the call signaling and call media provide opportunities for such components to be bypassed by custom VoIP solutions, as well as providing complications and cost in scaling.

Additionally, some of the existing implementations rely of out of band signaling, like SMS, to provide location information corresponding to the call signaling and media. This out of band signaling may be detected by the end user, which is not desirable. Moreover, the use of best effort, out of band signaling (e.g SMS) on a different physical layer than the PTT/VoIP signaling (e.g 1× vs DoRA) does not guarantee the delivery of the out of band location information delivery. Further, the device user may be able to shut it off the SMS or other location based service. Other implementations rely on the Network (e,g RAN, Core Network) to extract the location information for specific application services, however, such functionality may not be universally available. Thus, existing CALEA implementations have many drawbacks.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with some aspects, a method of reporting call information comprises establishing a group communication call for a call group having a plurality of member devices; identifying at least one target member device of the plurality of member devices as corresponding to a subject to be tracked; determining that the at least one target member device has joined the call; obtaining a bundle of information corresponding to the at least one target member device; correlating the bundle of information with a corresponding portion of the call signaling and the corresponding voice content in real time; and delivering, based on the target member device joining the call, the bundle of information and the corresponding portion of the call signaling and the corresponding voice content to a call intercept component.

In accordance with some aspects at least one processor configured to report call information comprises a first module for establishing a group communication call for a call group having a plurality of member devices; a second module for identifying at least one target member device of the plurality of member devices as corresponding to a subject to be tracked; a third module for determining that the at least one target member device has joined the call; a fourth module for obtaining a bundle of information corresponding to the at least one target member device; a fifth module for correlating the bundle of information with a corresponding portion of the call signaling and the corresponding voice content; and a sixth module for delivering, based on the target member device joining the call, the bundle of information and the corresponding portion of the call signaling and the corresponding voice content to a call intercept component.

In accordance with some aspects, a computer program product comprises a computer-readable medium comprising a first set of codes for causing a computer to establish a group communication call for a call group having a plurality of member devices; a second set of codes for causing the computer to identify at least one target member device of the plurality of member devices as corresponding to a subject to be tracked; a third set of codes for causing the computer to determine that the at least one target member device has joined the call; a fourth set of codes for causing the computer to obtain a bundle of information corresponding to the at least one target member device; a fifth set of codes for causing the computer to correlate the bundle of information with a corresponding portion of the call signaling and the corresponding voice content; and a sixth set of codes for causing the computer to deliver, based on the target member device joining the call, the bundle of information and the corresponding portion of the call signaling and the corresponding voice content to a call intercept component.

In accordance with some aspects, an apparatus comprises means for establishing a group communication call for a call group having a plurality of member devices; means for identifying at least one target member device of the plurality of member devices as corresponding to a subject to be tracked; means for determining that the at least one target member device has joined the call; means for obtaining a bundle of information corresponding to the at least one target member device; means for correlating the bundle of information with a corresponding portion of the call signaling and the corresponding voice content; and means for delivering, based on the target member device joining the call, the bundle of information and the corresponding portion of the call signaling and the corresponding voice content to a call intercept component.

In accordance with some aspects, an apparatus comprises at least one processor comprising a call setup component for establishing group communication call for a call group having a plurality of member devices; and a call hosting component for identifying a least one target member of the plurality of member devices as corresponding to a subject to be tracked, determining that the at least one target member device has joined the call, obtaining a bundle of information corresponding to the at least one target member device, correlating the bundle of information with a corresponding portion of the call signaling and the corresponding voice content, and delivering, based on the target member device joining the call, the bundle of information and the corresponding portion of the call signaling and the corresponding voice content to a call intercept component.

In accordance with some aspects, a method of reporting call information comprises establishing a group communication call for a call group having a plurality of member devices, wherein the group communication call comprises call signaling and corresponding voice content; identifying at least one target member device of the plurality of member devices as corresponding to a subject to be tracked; determining that the at least one target member device has joined the call; adding a call intercept component as a party to the group communication call without knowledge of the plurality of member devices; and delivering, based on the target member device joining the call, the call signaling and the corresponding voice content to the call group and the call intercept component.

In accordance with some aspects, at least one processor configured to report call information comprises a first module for establishing a group communication call for a call group having a plurality of member devices, wherein the group communication call comprises call signaling and corresponding voice content; a second module for identifying at least one target member device of the plurality of member devices as corresponding to a subject to be tracked; a third module for determining that the at least one target member device has joined the call; a fourth module for adding a call intercept component as a party to the group communication call without knowledge of the plurality of member devices; and a fifth module for delivering, based on the target member device joining the call, the call signaling and the corresponding voice content to the call group and the call intercept component.

In accordance with some aspects, a computer program product comprises a computer-readable medium comprising a first set of codes for causing a computer to establish a group communication call for a call group having a plurality of member devices, wherein the group communication call comprises call signaling and corresponding voice content; a second set of codes for causing the computer to identify at least one target member device of the plurality of member devices as corresponding to a subject to be tracked; a third set of codes for causing the computer to determine that the at least one target member device has joined the call; a fourth set of codes for causing the computer to add a call intercept component as a party to the group communication call without knowledge of the plurality of member devices; and a fifth set of codes for causing the computer to deliver, based on the target member device joining the call, the call signaling and the corresponding voice content to the call group and the call intercept component.

In accordance with some aspect, an apparatus comprises means for establishing a group communication call for a call group having a plurality of member devices, wherein the group communication call comprises call signaling and corresponding voice content; means for identifying at least one target member device of the plurality of member devices as corresponding to a subject to be tracked; means for determining that the at least one target member device has joined the call; means for adding a call intercept component as a party to the group communication call without knowledge of the plurality of member devices; and means for delivering, based on the target member device joining the call, the call signaling and the corresponding voice content to the call group and the call intercept component.

In accordance with some aspects, an apparatus comprises at least one processor comprising a call setup component for establishing a group communication call for a call group having a plurality of member devices, wherein the group communication call comprises call signaling and corresponding voice content, and a call hosting function for identifying at least one target member device of the plurality of member devices as corresponding to a subject to be tracked, determining that the at least one target member device has joined the call, adding a call intercept component as a party to the group communication call without knowledge of the plurality of member devices, and delivering, based on the target member device joining the call, the call signaling and the corresponding voice content to the call group and the call intercept component.

In accordance with some aspects, a method of reporting call information comprises establishing a group communication call for a call group having a plurality of member devices, wherein the group communication call comprises call signaling and corresponding voice content; identifying at least one target member device of the plurality of member devices as corresponding to a subject to be tracked; determining that the at least one target member device has joined the call; and delivering the call signaling and the corresponding voice content across a same path to a call intercept component such that the call signaling and the corresponding voice content are received at the call intercept component at a same time.

In accordance with some aspects, at least one processor configured to report call information comprises a first module for establishing a group communication call for a call group having a plurality of member devices, wherein the group communication call comprises call signaling and corresponding voice content; a second module for identifying at least one target member device of the plurality of member devices as corresponding to a subject to be tracked; a third module for determining that the at least one target member device has joined the call; and a fourth module for delivering the call signaling and the corresponding voice content across a same path to a call intercept component such that the call signaling and the corresponding voice content are received at the call intercept component at a same time.

In accordance with some aspects, a computer program product comprises a computer-readable medium comprising a first set of codes for causing a computer to establish a group communication call for a call group having a plurality of member devices, wherein the group communication call comprises call signaling and corresponding voice content; a second set of codes for causing the computer to identify at least one target member device of the plurality of member devices as corresponding to a subject to be tracked; a third set of codes for causing the computer to that the at least one target member device has joined the call; and a fourth set of codes for causing the computer to deliver the call signaling and the corresponding voice content across a same path to a call intercept component such that the call signaling and the corresponding voice content are received at the call intercept component at a same time.

In accordance with some aspects, an apparatus comprises means for establishing a group communication call for a call group having a plurality of member devices, wherein the group communication call comprises call signaling and corresponding voice content; means for identifying at least one target member device of the plurality of member devices as corresponding to a subject to be tracked; means for determining that the at least one target member device has joined the call; and means for delivering the call signaling and the corresponding voice content across a same path to a call intercept component such that the call signaling and the corresponding voice content are received at the call intercept component at a same time.

In accordance with some aspects, an apparatus comprises at least one processor comprising a call setup component for establishing a group communication call for a call group having a plurality of member devices, wherein the group communication call comprises call signaling and corresponding voice content, and a call hosting function for identifying at least one target member device of the plurality of member devices as corresponding to a subject to be tracked, determining that the at least one target member device has joined the call, and delivering the call signaling and the corresponding voice content across a same path to a call intercept component such that the call signaling and the corresponding voice content are received at the call intercept component at a same time.

In some aspects, a method of providing call information in a lawfully intercepted wireless device comprises joining a group communication call for a call group having a plurality of member devices; generating a bundle of information corresponding to the lawfully intercepted wireless device, the bundle of information including location information; and transmitting the bundled information to a call intercept component.

In some aspects, at least one processor configured to provide call information in a lawfully intercepted wireless device comprises a first module for joining a group communication call for a call group having a plurality of member devices; a second module for generating a bundle of information corresponding to the lawfully intercepted wireless device, the bundle of information including location information; and a third module for transmitting the bundled information to a call intercept component.

In some aspects, a computer program product comprises a computer-readable medium comprising a first set of codes for causing a computer to join a group communication call for a call group having a plurality of member devices; a second set of codes for causing the computer to generate a bundle of information corresponding to the lawfully intercepted wireless device, the bundle of information including location information; and a third set of codes for causing the computer to transmit the bundled information to a call intercept component.

In some aspects, an apparatus comprises means for joining a group communication call for a call group having a plurality of member devices; means for generating a bundle of information corresponding to the lawfully intercepted wireless device, the bundle of information including location information; and means for transmitting the bundled information to a call intercept component.

In some aspect, and apparatus comprises at least one processor comprising a call processing component for joining a group communication call for a group call having a plurality of member devices, generating a bundle of information corresponding to the lawfully intercepted wireless device, the bundle of information including location information, and transmitting the bundled information to a call intercept component.

In some aspects, a method of monitoring call information comprises transmitting an authorization to a monitoring component, the authorization providing identifying information for one or more monitoring targets; receiving notification that a group call including at least one monitoring target has been established; and receiving call signaling and corresponding voice content associated with the group call at a same time To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The apparatus and methods described herein enable lawful monitoring of targeted devices in a group call setting. When a group call is initiated having a target as a member of the group, the collection of call signaling and voice communications begins. The law enforcement authority receives intercepted voice communications and other data in real-time or near real-time. In essence, the law enforcement authority is added as a party to the group call without the knowledge of the members of the group.

Figure 1:
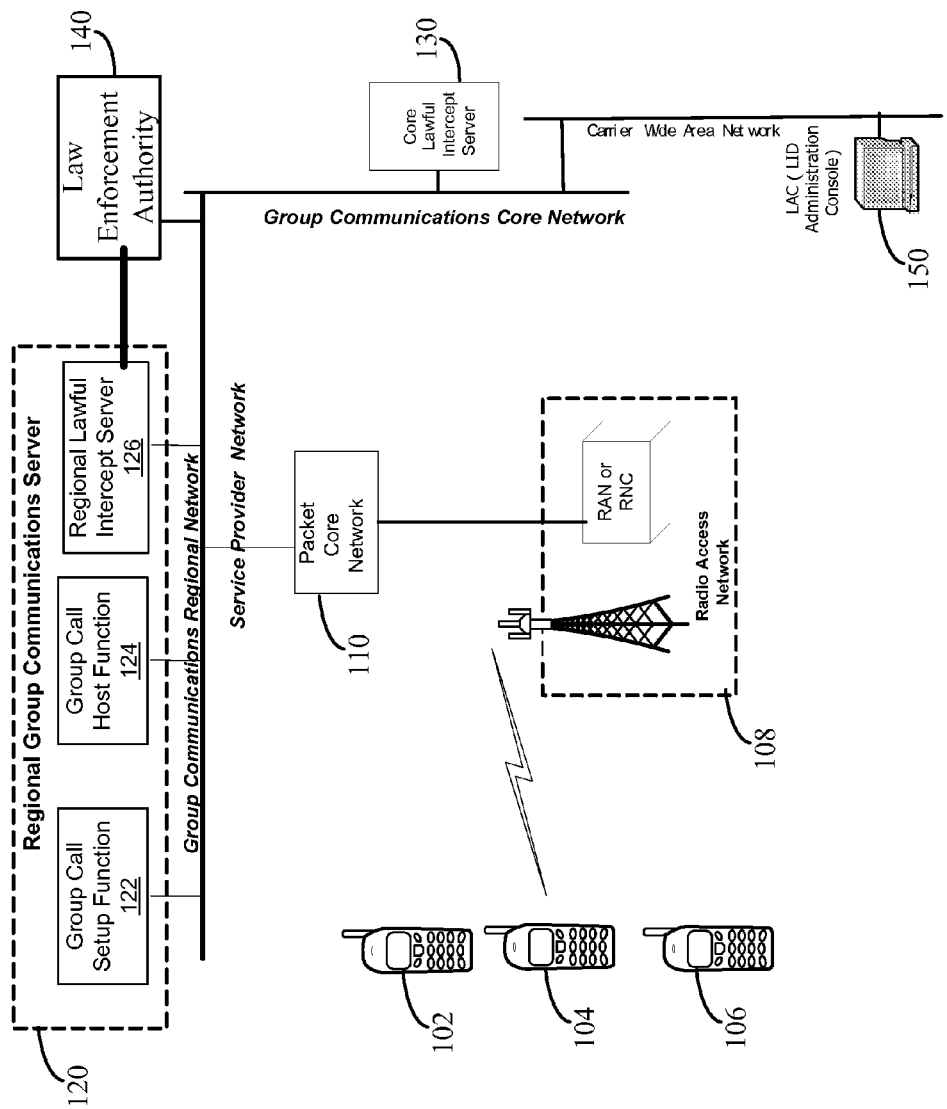
FIG. 1 depicts a group communication system, in accordance with some disclosed aspects.

FIG. 1 is a block diagram illustrating a group communication system 100 configured for providing lawful intercept services. As shown in FIG. 1, a plurality of wireless devices 102, 104, and 106 form a group capable of engaging in a group communication session. Wireless devices 102, 104, and 106 may communicate over radio access network 108, which is coupled to packet core network 110. To provide lawful intercept services, group communication system 100 includes one or more regional group communications servers 120, a core lawful intercept server 130, one or more law enforcement authorities (LEAs) 140, and one or more lawful intercept definition (LID) administrators 150.

LID administrators 150 may be configured to provision lawful intercept definitions for targets to be monitored. This may include, for example, providing a target name, mobile telephone number, mobile address, and/or other identifying information. Identifying information for targets may be provided to core lawful intercept server 130, which may determine which regional group communication server 120 is responsible for monitoring each target. That is, a regional group communications server 120 may serve as a monitoring component. Each LID administration Console (LAC) 150 may be associated with a LEA 140 that is configured to receive lawful intercept messages and data. In some aspects, LEA 140 may be added as a member of a group call without knowledge of the other members of the group call. As such, LEA 140 receives the voice content exchanged during the call in real-time, as well as other group call-related information.

When a wireless device commences a group call, the call may be intercepted by group communication server 120 upon determining that a target is a member of the group. The group call setup function 122 may be configured to intercept a call in which a target is scheduled to be or actually is a participant, and to setup a monitoring session for intercepting call data and signaling. The intercept functionality may include, for example, adding LEA 140 as a party to the call without knowledge of the other members of the group call. The group call setup function 122 may also be configured to notify the group call hosting function 124 that a group call has been established, the group including at least one target. Group call hosting function 124 may be configured to determine that a target has joined the call, to collect, aggregate, and sequence the intercepted information, and to forward the information to regional lawful intercept server 126. Regional lawful intercept server 126 may be configured to translate the intercepted messages into a format accessible by the LEAs 140.

Figure 2A:
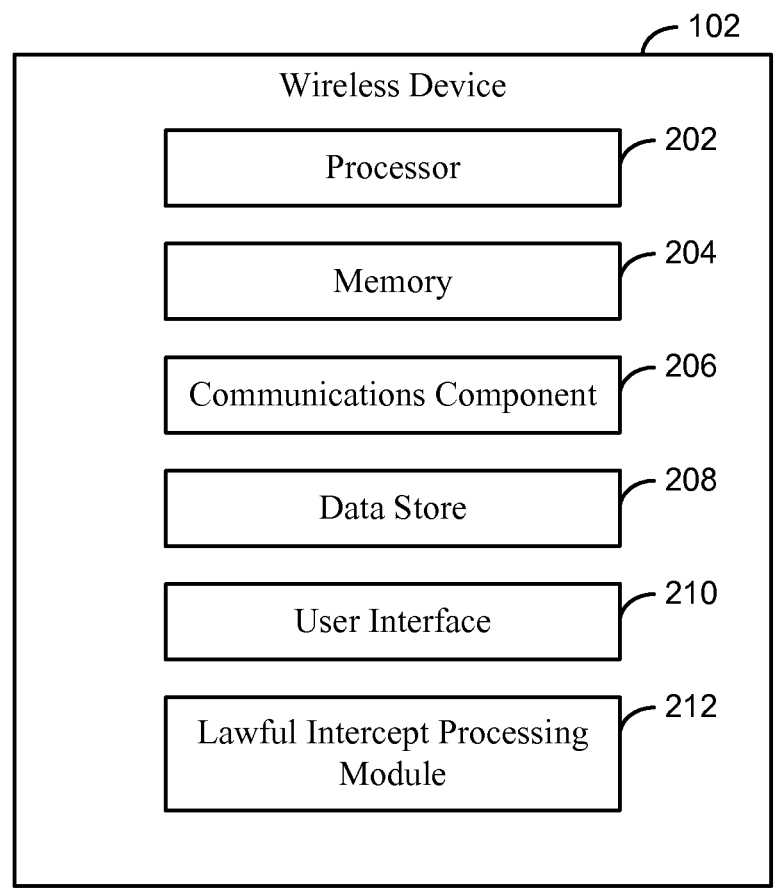
FIG. 2A depicts a wireless device, in accordance with some disclosed aspects.

FIG. 2A depicts a wireless device, such as wireless device 102, depicted in FIG. 1. Wireless devices 104 and 106 may each include the same or similar components. Wireless device 102 may include a processor 202 for carrying out processing functions associated with one or more of components and functions described herein. Processor 202 can include a single or multiple set of processors or multi-core processors. Moreover, processor 202 can be implemented as an integrated processing system and/or a distributed processing system.

Wireless device 102 further includes a memory 204, such as for storing data used herein and/or local versions of applications being executed by processor 202. Memory 204 can include any type of memory usable by a computer, such as random access memory (RAM), read only memory (ROM), tapes, magnetic discs, optical discs, volatile memory, non-volatile memory, and any combination thereof.

Further, wireless device 102 may include a communications component 206 that provides for establishing and maintaining communications with one or more parties utilizing hardware, software, and services as described herein. Communications component 206 may carry communications between components on wireless device 102, as well as between wireless device 102 and external devices, such as devices located across a communications network and/or devices serially or locally connected to wireless device 102. For example, communications component 206 may include one or more buses, and may further include transmit chain components and receive chain components associated with a transmitter and receiver, respectively, operable for interfacing with external devices.

Additionally, wireless device 102 may further include a data store 208, which can be any suitable combination of hardware and/or software, that provides for mass storage of information, databases, and programs employed in connection with aspects described herein. For example, data store 208 may be a data repository for applications not currently being executed by processor 202.

Wireless device 102 may additionally include a user interface component 210 operable to receive inputs from a user of wireless device 102, and further operable to generate outputs for presentation to the user. User interface component 210 may include one or more input devices, including but not limited to a keyboard, a number pad, a mouse, a touch-sensitive display, a navigation key, a function key, a microphone, a voice recognition component, a camera, and/or any other mechanism capable of receiving an input from a user, or any combination thereof. Further, user interface component 210 may include one or more output devices, including but not limited to a display, a speaker, a haptic feedback mechanism, a printer, any other mechanism capable of presenting an output to a user, or any combination thereof.

Additionally, in some aspects, wireless device 102 may include lawful intercept processing module 212 configured to bundle location information, signaling, and/or any other information subject to lawful intercept, and to provide this information to a regional group communications server, such as regional group communication server 120, depicted in FIG. 1. According to some aspects, the lawful intercept processing module 212 provides location information, via signaling, when a call is first initiated and each time the device changes location.

Figure 2B:
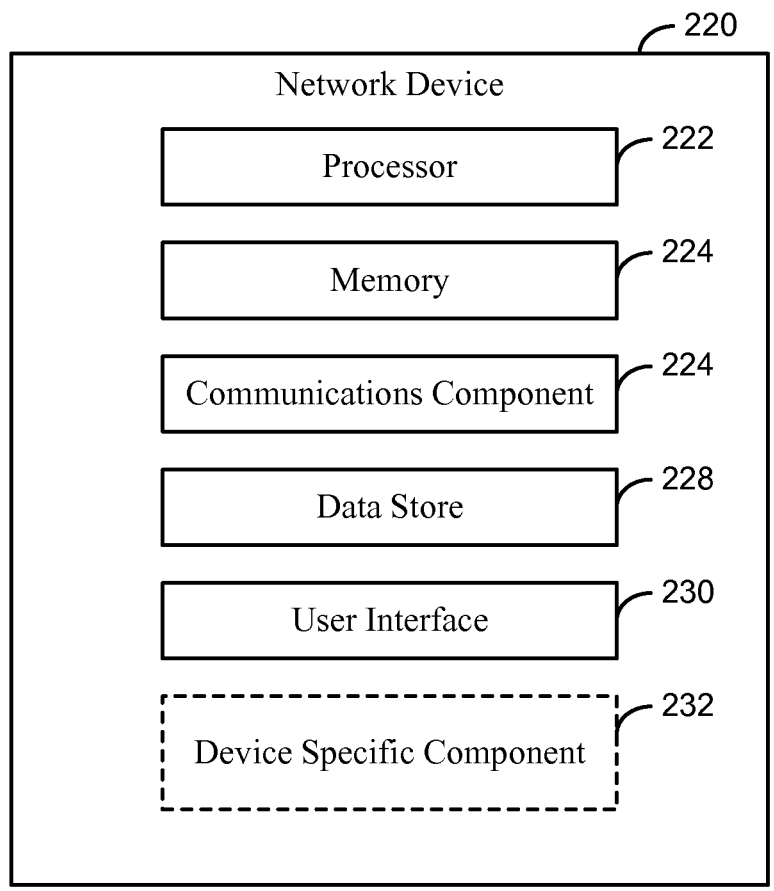
FIG. 2B depicts a network device, in accordance with some disclosed aspects.

FIG. 2B depicts a network device 220. Network device 220 may represent, for example, LAC 150, group call setup function 122, group call host function 124, and/or lawful intercept server 126. Network device 220 may include a processor 222, memory 224, communications component 226, data store 228, and user interface 230. These components operate in a manner similar to the corresponding components of wireless device 102, and further description will not be provided. Network device 220 may also include one or more device specific components 232 for performing specific functions of the specific network device.

Figure 3:
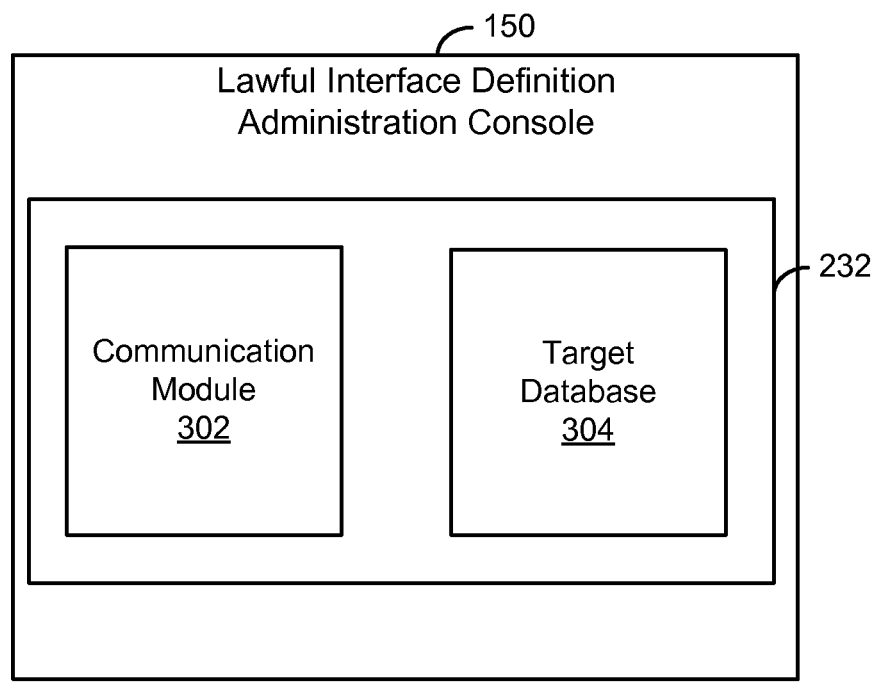
FIG. 3 depicts a lawful intercept definition administration console, in accordance with some disclosed aspects.

FIG. 3 depicts LAC 150 in greater detail. LAC 150 may include a device specific component 232 that includes communications module 302 configured to receive lawful authorizations to perform call intercept functions, and to provide such authorizations to a monitoring component, such as regional group communications server 120. Communications module 302 may further be configured to provide target information to core lawful intercept server 130. Information may include, for example, the target name, mobile phone number, etc. Device specific component 232 may also include a target database 304 that stores information about each target to be monitored.

Figure 4:
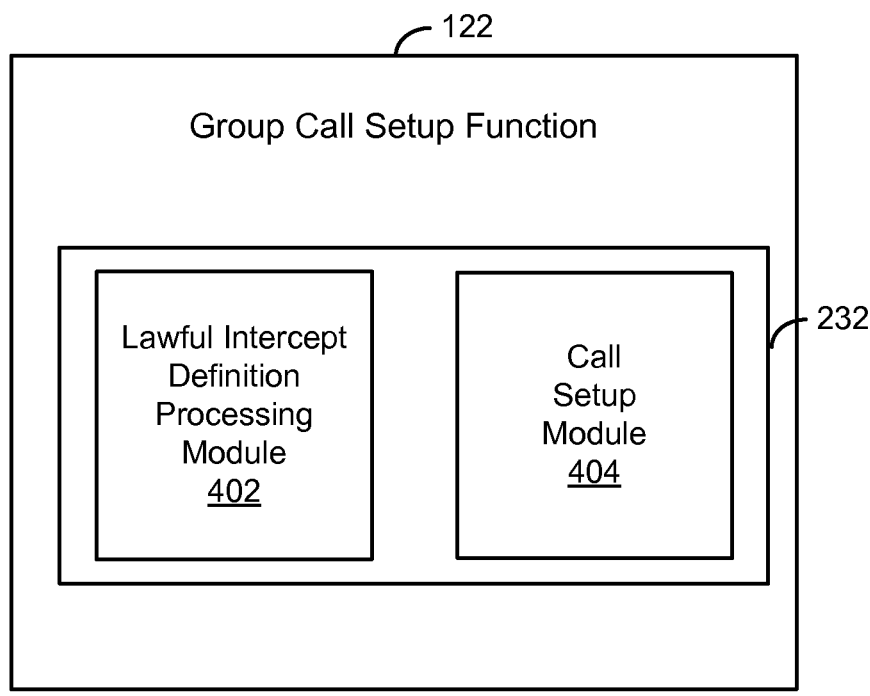
FIG. 4 depicts a regional group call setup function, in accordance with some disclosed aspects.

Turning now to FIG. 4, regional group call setup function (RGCSF) 122 is shown in greater detail. RGCSF 122 may include a device specific component 232 that includes a lawful intercept definition processing module 402 and a call setup module 404. Lawful intercept definition processing 402 may be configured to receive lawful intercept definitions from LAC 150. For example, the lawful intercept definitions may include a name of a monitoring target, a phone number of a monitoring target, or any other information useful for determining if the monitoring target is an actual or invited participant in a group call. Using this information, lawful intercept definition processing module 402 may be configured to determine whether a monitoring target is a member of a planned group call. For example, in an aspect, lawful intercept definition processing module 402 may include a comparator component or algorithm to match all or some portion of the lawful intercept definition information with all or some portion of information on group call participants for group calls that are being established. Lawful intercept definition processing module 402 may also be configured to collect initial signaling data associated with establishing a group call. For example, even before a monitoring target joins the call, lawful intercept definition processing module 402 may obtain and temporarily store all information and communications associated with the group call in a proactive manner so that such information can be recalled when the target joins the call. Additionally, call setup module 404 may be configured to setup the group call for monitoring. This may include, for example, receiving the call request, and adding the LEA 140 as a party to the call without the knowledge of the members of the group call.

Figure 5:
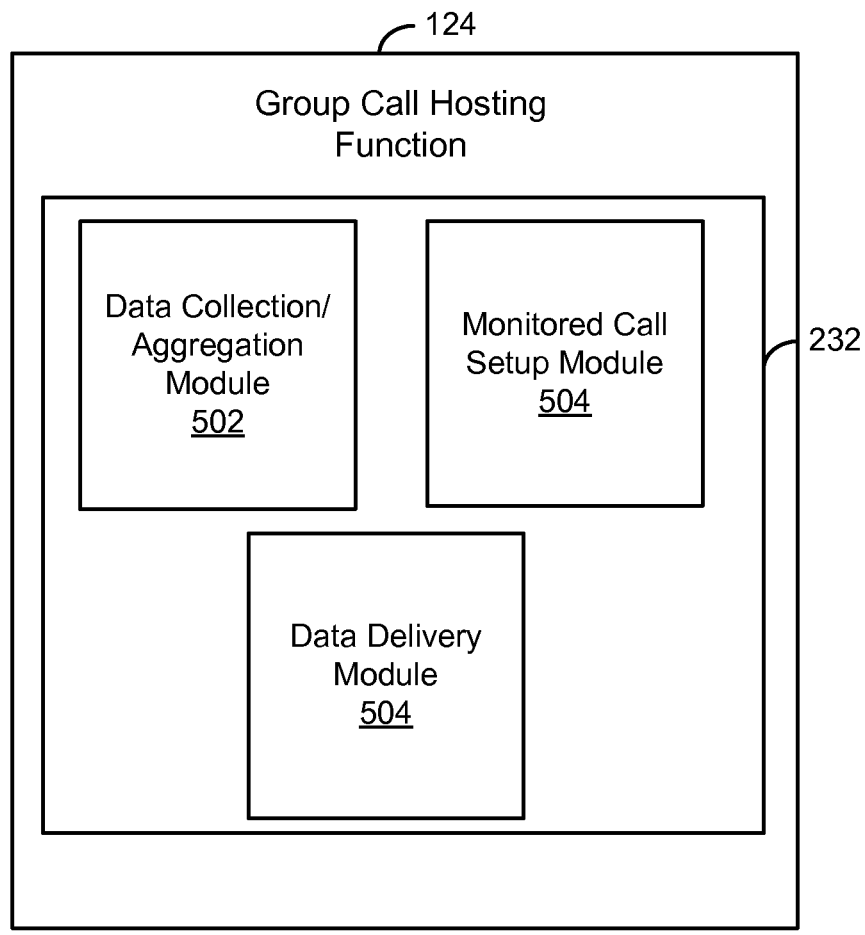
FIG. 5 depicts a regional group call host function, in accordance with some disclosed aspects.

FIG. 5 illustrates regional group call host function 124 in greater detail. A device specific component 232 including a data collection/aggregation module 502 may be provided for intercepting data from a wireless device, such as signaling information and media, and aggregating the intercepted data prior to providing the data to the LEA. For example, the data collections/aggregation module 502 may receive a bundle of information from a wireless device. Data collection/aggregation module 502 may be configured to correlate intercepted data such that signaling and the corresponding voice components are delivered to the LEA together and in the order of receipt. Additionally, in some aspects, the correlated intercepted data may be delivered to the LEA in real-time or near real-time. Additionally, device specific component 232 may include a monitored call setup module 504 may be configured to determine whether a monitoring target has joined the call. For example, monitored call setup module 504 may include a monitoring component or algorithm that tracks group call participants and generates a notice when an identified monitoring target has joined the call, thereby triggering, for example, interception activities and the addition of the LEA to the group call. Device specific component 232 may also include a data delivery module 506 for providing intercepted data to a lawful intercept server.

Figure 6:
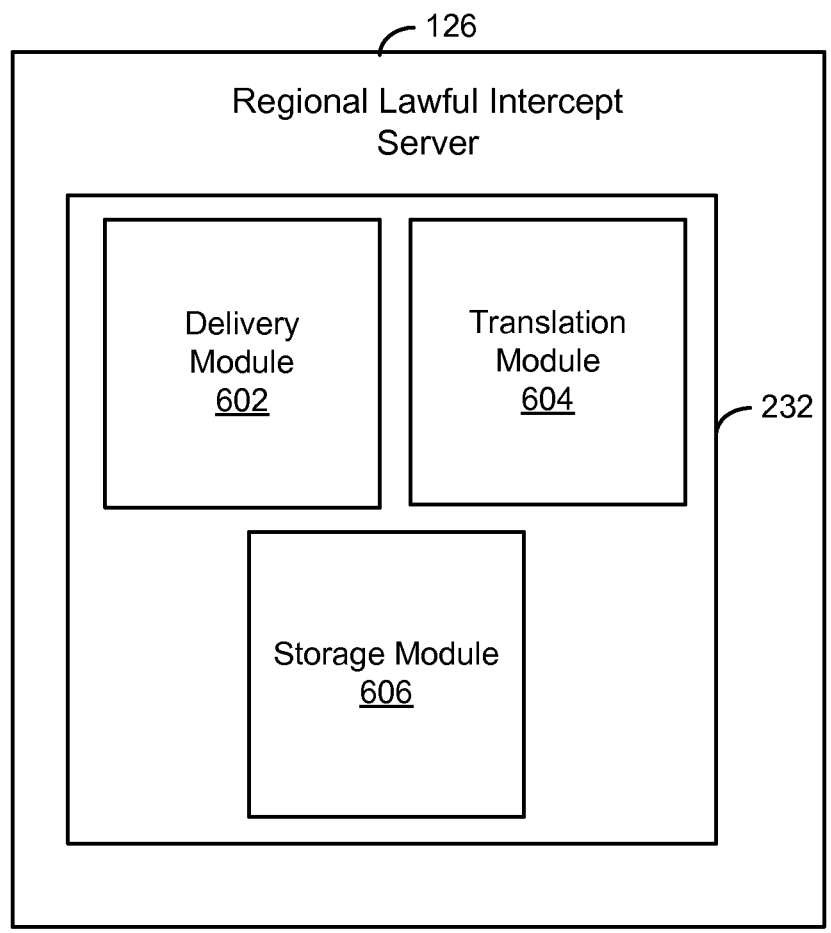
FIG. 6 depicts a regional lawful intercept server, in accordance with some disclosed aspects.

FIG. 6 depicts lawful intercept server 126 in further detail. Lawful intercept server 126 acts as a gateway between the regional group communication server and one or more LEAs. Lawful intercept server 126 may include a device specific component 232 that includes a delivery module 602 for notifying a LEA that a call having a target present has been established, and for delivering intercepted information received from the regional call hosting function 124 to a LEA. Device specific component 232 may also include a translation module 604 for translating intercepted data into a format accessible by LEAs, if necessary. For example, translation module 604 translation module may include a format mapping database that maps intercepted data of a first format not understandable by the LEA into intercepted data of a second format understandable by the LEA. In addition, device specific component 232 may include a storage module 606 for storing intercepted data prior to delivering the data to the LEA. For example, in a case wherein the LEA is unable to receive data in real-time, the data may be buffered at lawful intercept server 126 until such time as the data can be delivered.

Figure 7:
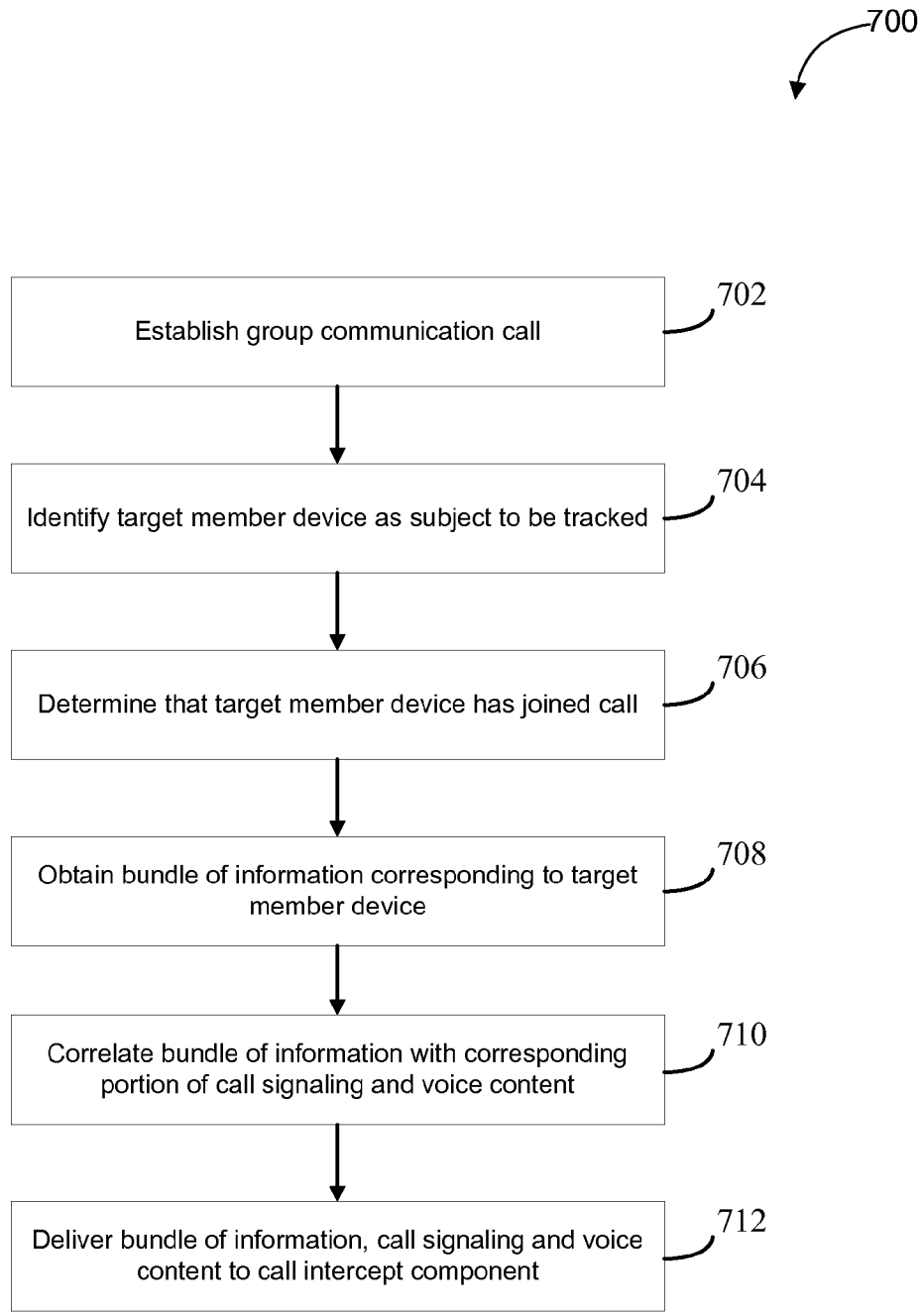
FIG. 7 depicts an aspect of a method for reporting call information, in accordance with some disclosed aspects.

FIG. 7 depicts one aspect of an exemplary method 700 of reporting call information in accordance with some aspects. As depicted at 702, a group communication call for a call group having a plurality of member devices may be established. For example, call setup module 404 of regional group call setup function 122, depicted in FIG. 4, may be configured to establish the group call. As depicted at 704, at least one target member device of the plurality of member devices may be identified as corresponding to a subject to be tracked. As depicted at 706, a determination may be made that at least one target member device has joined the call. For example, monitored call setup module 504 of regional group call host function 124, depicted in FIG. 5, may be configured to perform this determination. As depicted at 708, a bundle of information corresponding to the at least one target member device may be obtained. As depicted at 710, the bundle of information may be correlated with a corresponding portion of the call signaling and the corresponding voice content. In some aspects, data collection/aggregation module 502 of regional group call hosting function 124, depicted in FIG. 5, may obtain the bundle of information and perform the correlation. As depicted at 712, the bundle of information along with the corresponding portion of the call signaling and the corresponding voice content may be delivered, based on the target member device joining the call, to a call intercept component. For example, delivery module 602 of lawful intercept server 124, depicted in FIG. 6, may perform this delivery. In some aspects, delivery of the call signaling and corresponding voice content may occur across a same path to the call intercept component such that the call signaling and the corresponding voice content are received at the call intercept component at the same time.

Figure 8:
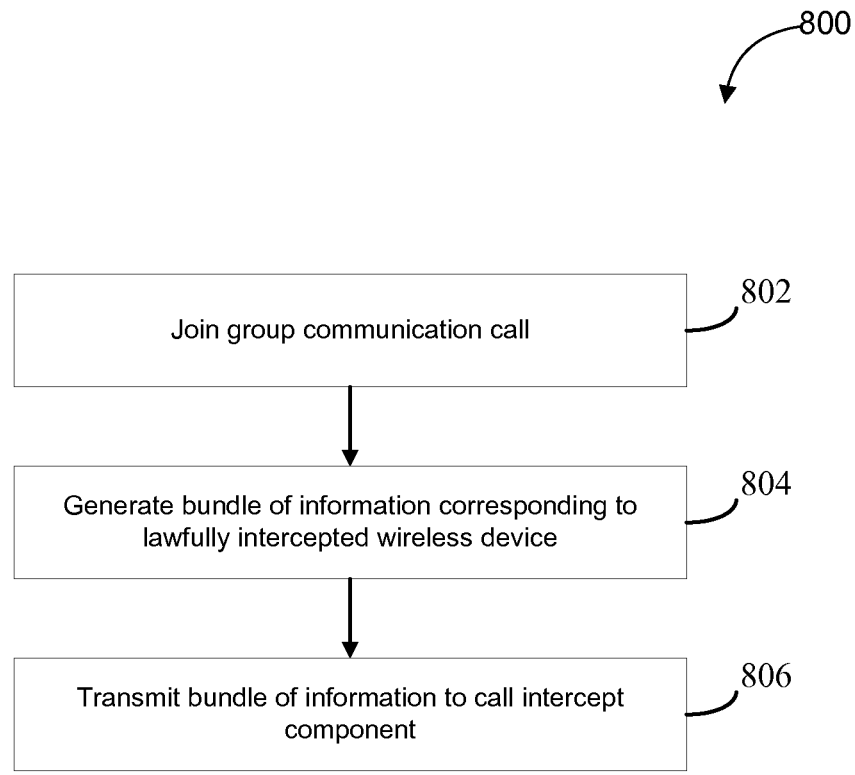
FIG. 8 depicts an aspect of a method for providing call information, in accordance with some disclosed aspects.

FIG. 8 depicts one aspect of an exemplary method 800 of providing call information from a lawfully intercepted wireless device, in accordance with some aspects. For example, method 800 may be performed by any of wireless devices 102, 104, and 106, depicted in FIGS. 1 and 2. As depicted at 802, a wireless device may join a group communication call for a call group having a plurality of member devices. As depicted at 804, a bundle of information corresponding to the lawfully intercepted wireless device may be generated. In some aspects, the bundle of information may include location information indicating the location of the wireless device. As depicted at 806, the bundled information may be transmitted to a call intercept component.

Figure 9:
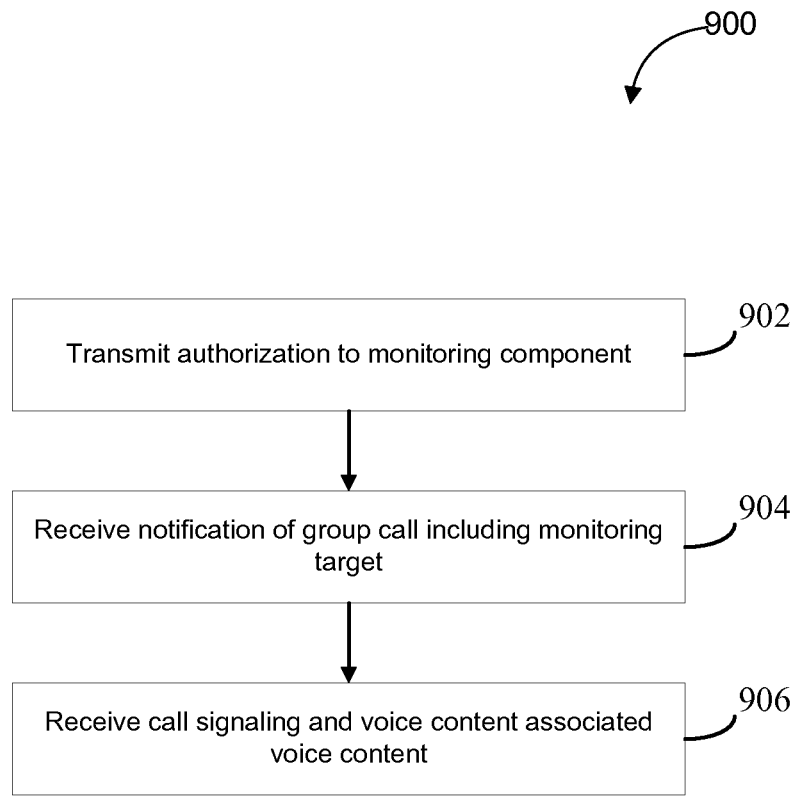
FIG. 9 depicts an aspect of a method for monitoring call information, in accordance with some disclosed aspects.

FIG. 9 depicts one aspect of an exemplary method 900 of monitoring call information, in accordance with some aspects. For example, method 900 may be implemented by LEA 140 and/or LAC 150, depicted in FIGS. 1 and 3. As depicted at 902, an authorization may be transmitted to a monitoring component, the authorization providing identifying information for one or more monitoring targets. As depicted at 904, a notification may be received that a group call including at least one monitoring target has been established. As depicted at 906, call signaling and corresponding voice content associated with the group call may be received at the same time.

Figure 10:
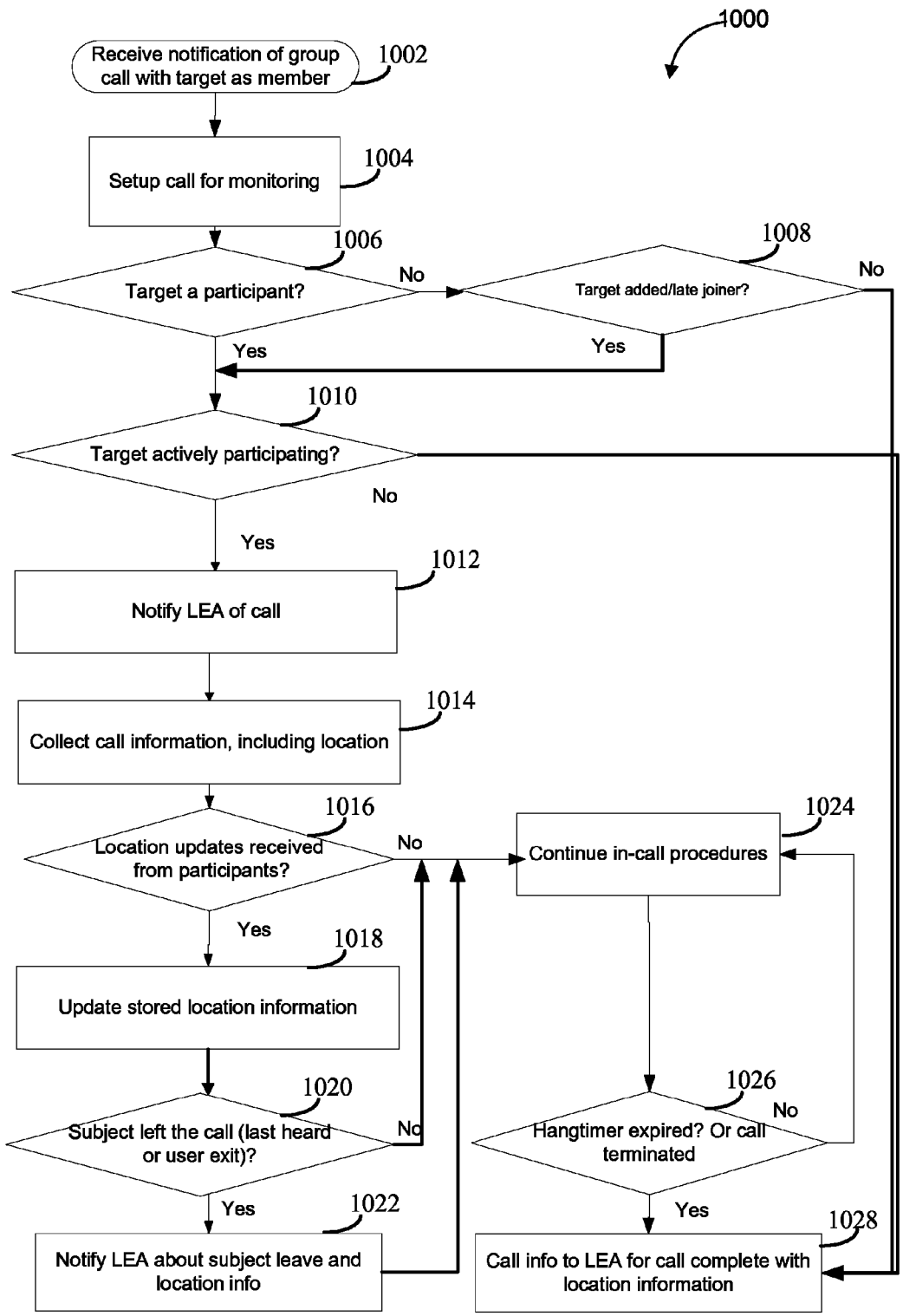
FIG. 10 is a flowchart depicting an aspect of a method for lawfully intercepting call signaling and media, in accordance with some disclosed aspects.

FIG. 10 is a high-level flowchart depicting one aspect of an exemplary method 1000 for lawfully intercepting call signaling and media in a group call. In some aspects, the method may be performed by regional group communications server 120, shown in FIG. 1. As depicted at 1002, notification is received that a group call having a target as a member of the group has been established. Call set-up procedures for monitoring the call may then be performed, as depicted at 1004. These call set-up procedures may include, for example, adding a call intercept component, such as LEA 140 (FIG. 1), as a member of the group. The members of the group call are unaware of the monitoring.

As depicted at 1006, a determination is made as to whether a target has joined the call. If not, the system continues to monitor to determine if newly added participants/late-joiners to the call are identified targets, as depicted at 1008. Once a target has been identified as being on the call, the system may determine whether the target is an active participant in the call, as depicted at 1010. If so, the LEA is notified that a call having a target as an active participant has been established, as depicted at 1012.

As depicted at 1014, call information, including, for example, location information associated with the target is collected and delivered to the LEA. As the call continues, the system determines whether any location update reports have been received from the call participants, as depicted at 1016. If so, the stored location information is updated, as shown at 1018. As shown at 1020, the system determines whether the target has left the call. If the target has left the call, the LEA is notified that the target has left the call, and the last location of the target is reported to the LEA, as shown at 1022. Upon determining that a location update has not been received, that the target has not left the call, and/or after notifying the LEA that a target has left the call, monitoring of the call continues, as shown at 1024.

A hang-timer may be used to determine whether participants have stopped talking for a pre-defined period of time. As the call continues, the system determines whether a hang-timer has expired, or whether the call has terminated, as shown at 1026. If either has occurred, the call information, including the last known location of the target, is communicated to the LEA, as shown at 1028. If the hang timer has not expired, or if the call has not terminated, monitoring of the call continues, as shown at 1024.

Figure 11:
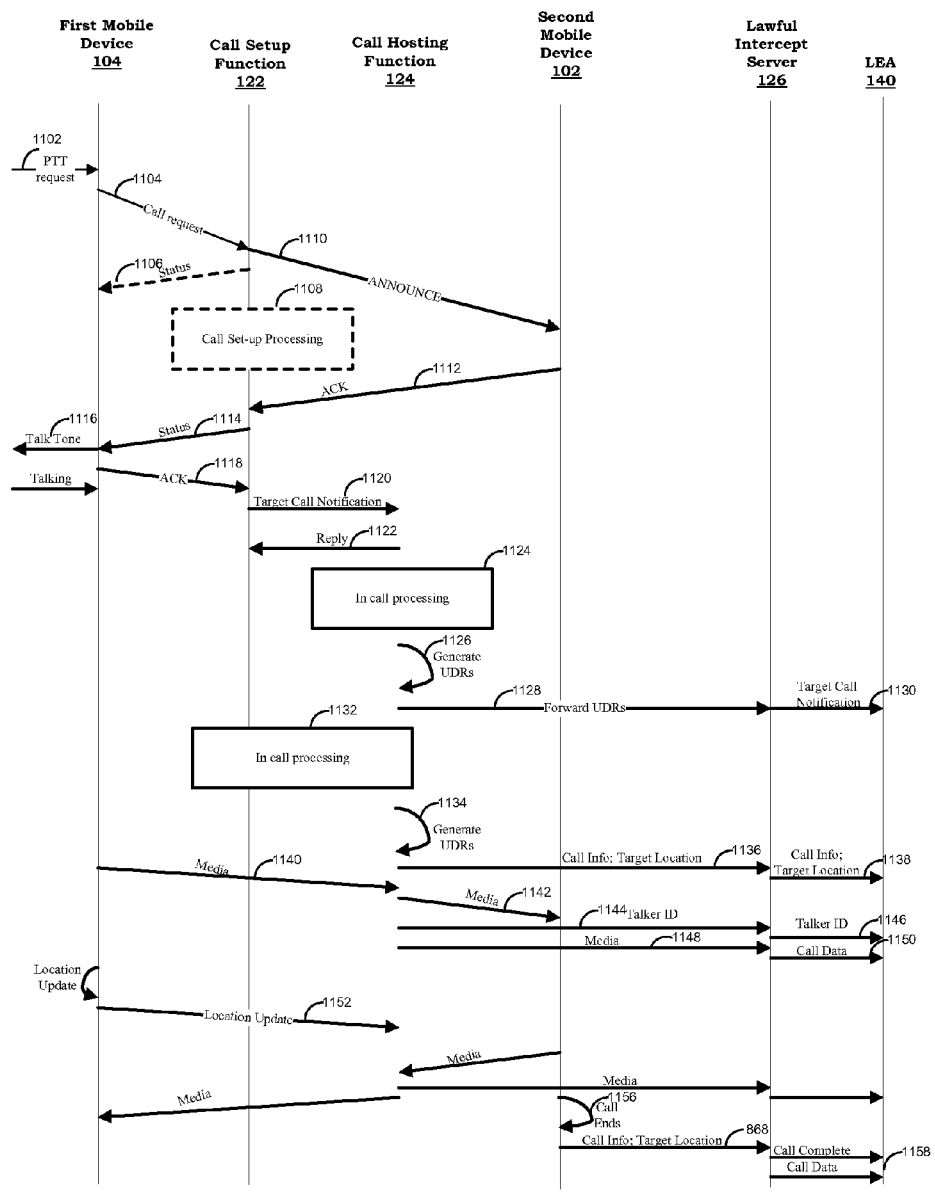
FIG. 11 depicts an aspect of a message flow exchange, in accordance with some disclosed aspects.

FIG. 11 depicts one aspect of an exemplary message flow showing an exchange of messages among a first wireless device 104, a regional group call setup function 122, a regional group call host function 124, a second wireless device 102, a regional lawful intercept server 126, and a law enforcement authority 140. In this exemplary message flow, first wireless device 104 is a wireless device that is participant in a group call, but is not a target for monitoring; second wireless device 102 is a participant in the group call that is a target for monitoring.

As shown at 1102, a user of first wireless device 104 may issue a PTT request to initiate a group call. While first wireless device 104, which is not a target for monitoring, initiates the call in this example, second wireless device 102, which is a target for monitoring, can initiate the call. The call request is routed to regional group call setup function 122, as shown at 1104. Regional group call setup function 122 may then announce to other members of the group, including second wireless device 102, that a group call has been initiated, as shown at 1110.

In some aspects, immediately upon receipt of a the call setup request, regional group call setup function 122 may send an acknowledgement to first wireless device 104, as shown at 1106, and a call setup process to begin monitoring session may be initiated, as shown at 1108. In this exemplary implementation, it is assumed that at least one party will answer and join the call. Upon receipt of the acknowledgment, first wireless device 102 may immediately begin talking without waiting for a response from another member of the group.

As depicted at 1112, second wireless device 102 acknowledges that a call has been initiated. The location information of the wireless device 102 may be included in the acknowledgement. Upon receipt of this acknowledgment, regional group call setup function 122 transmits a status message to first wireless device 104 advising of the status of the group call, as depicted at 1114. That is, regional group call setup function 122 informs first wireless device 104 that second wireless device 102 has acknowledged the call. While only two members of the group call are shown in FIG. 11, there may be additional members of the group, and each member would transmit an acknowledgement, as shown at 1112, and the status of each member would be reported to first wireless device 104.

As shown at 1116, upon receipt of at the status message from regional group call setup function 122, first wireless device 104 receives a talk tone and the user is able to begin talking First wireless device 104 may transmit its location to regional group call setup function 122, as shown at 1118, via an acknowledgement message. The location information of the wireless device 104 may included in the acknowledgement. As depicted at 1120, 1122, a target call notification may be transmitted to the regional call host setup function 124. As depicted at 1124, regional call hosting function 124 may perform call processing steps, such as determining whether a monitoring target has joined the call. The regional call hosting function 124 may also begin to collect signaling information associated with the call. Such information may be used to generate a usage data record (UDR), as shown at 1126. The UDR may be forwarded to the LIS 126, as shown at 1128. The LIS 126 may then notify the LEA 140 that a call having a target as a member is in progress, as shown at 1130.

As the call continues, as shown at 1132, call setup function 122 may add LEA 140 as a party to the call, and additional information may be collected by the regional call hosting function 124, and additional UDRs may be created, as shown at 1134. Call information may include, for example, the location of the target, and this information may be forwarded to the LIS 126, as shown at 1136. The LIS may then provide call state information, including the location of the target, to LEA 140, as shown at 1138. As members of the group talk, the media is intercepted by group call hosting function 124, as shown at 1140, before being forwarded to the other group members, as shown at 1142. Group call hosting function 124 can immediately provide call arbitration information, such as the identity of the talker, as shown at 1144, as well as the call signaling and media, as shown at 848, to LIS 126. The arbitration information and call signaling/media may be transmitted to LEA 140, as shown at 1146, 1150.

In accordance with some aspects, each time a device changes locations, an update may be sent to group call hosting function 124 as shown, for example, at 1152, and group call hosting function 124 updates its location tables. Upon determining that a call has terminated, call hosting function 124 may transmit the final location of the target to the LIS 126, as shown at 1156. LIS 126 may then notify LEA 140 that the call has been completed and provide the final location to LEA 140, as shown at 1158.

Figure 12:
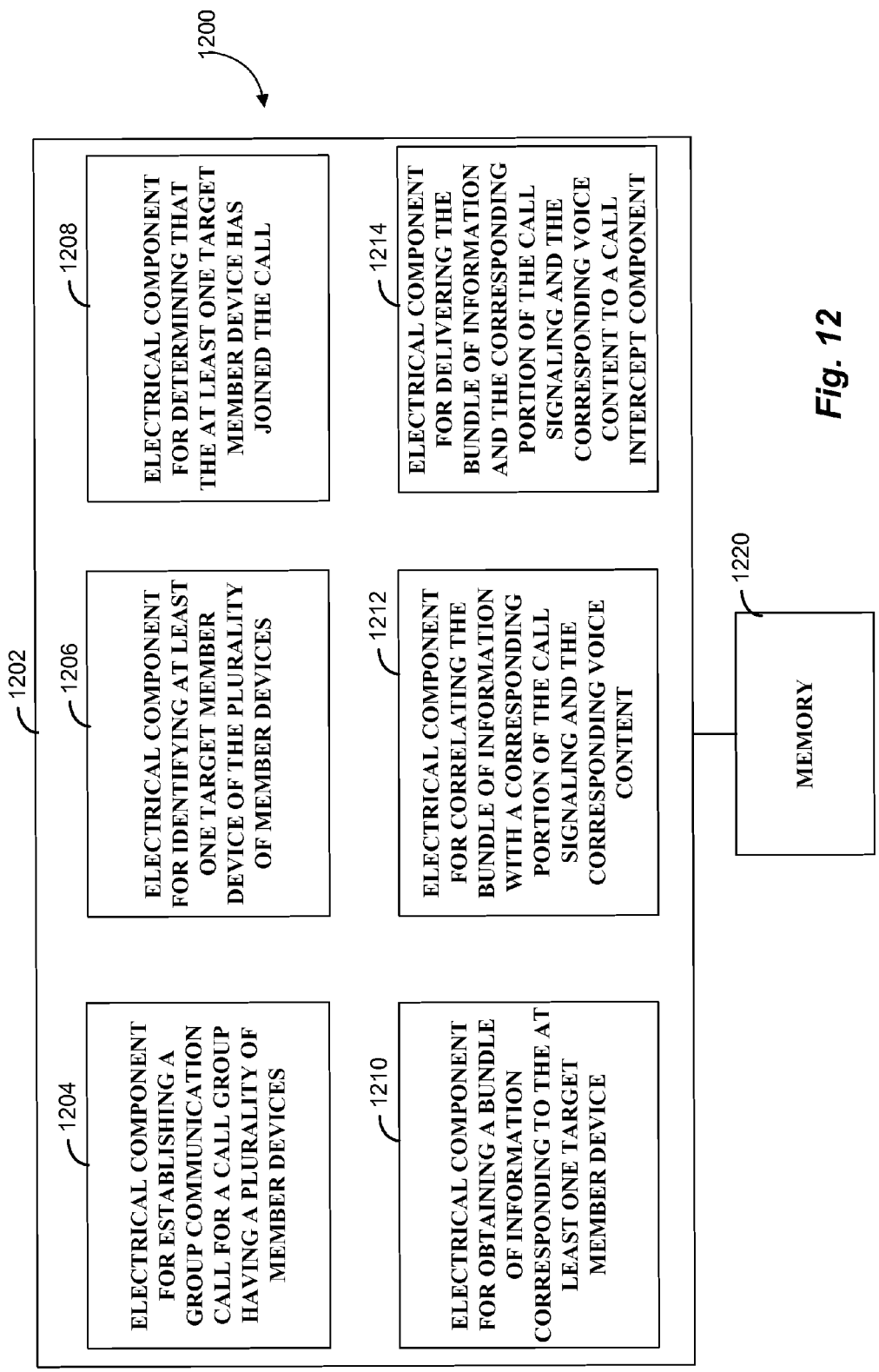
FIG. 12 depicts a system for reporting call information, in accordance with some disclosed aspects.

With reference to FIG. 12, illustrated is a system 1200 for reporting call information. For example, system 1200 can reside at least partially within a group communications server, such as regional group communications server 120 (FIG. 1). It is to be appreciated that system 1200 is represented as including functional blocks, which can be functional blocks that represent functions implemented by a computing platform, processor, software, or combination thereof such as firmware. System 1200 includes a logical grouping 1202 of electrical components that can act in conjunction. For instance, logical grouping 1202 can include an electrical component 1204 for establishing a group communication call for a call group having a plurality of member devices. Moreover, logical grouping 1202 can include an electrical component 1206 for identifying at least one target member device of the plurality of member devices as corresponding to a subject to be tracked. Further, logical grouping 1202 can include an electrical component 1208 for determining that the at least one target member device has joined the call. In addition, logical grouping 1202 can include an electrical component 1210 for obtaining a bundle of information corresponding to the at least one target member device. Additionally, logical grouping 1202 can include an electrical component 1212 for correlating the bundle of information with a corresponding portion of the call signaling and the corresponding voice content. The logical grouping 1202 may also include an electrical component 1214 for delivering, based on the target member device joining the call, the bundle of information and the corresponding portion of the call signaling and the corresponding voice content to a call intercept component. System 1200 can include a memory 1220 that retains instructions for executing functions associated with electrical components 1204-1214. While shown as being external to memory 1220, it is to be understood that one or more of electrical components 1204-1214 can exist within memory 1220.

Figure 13:
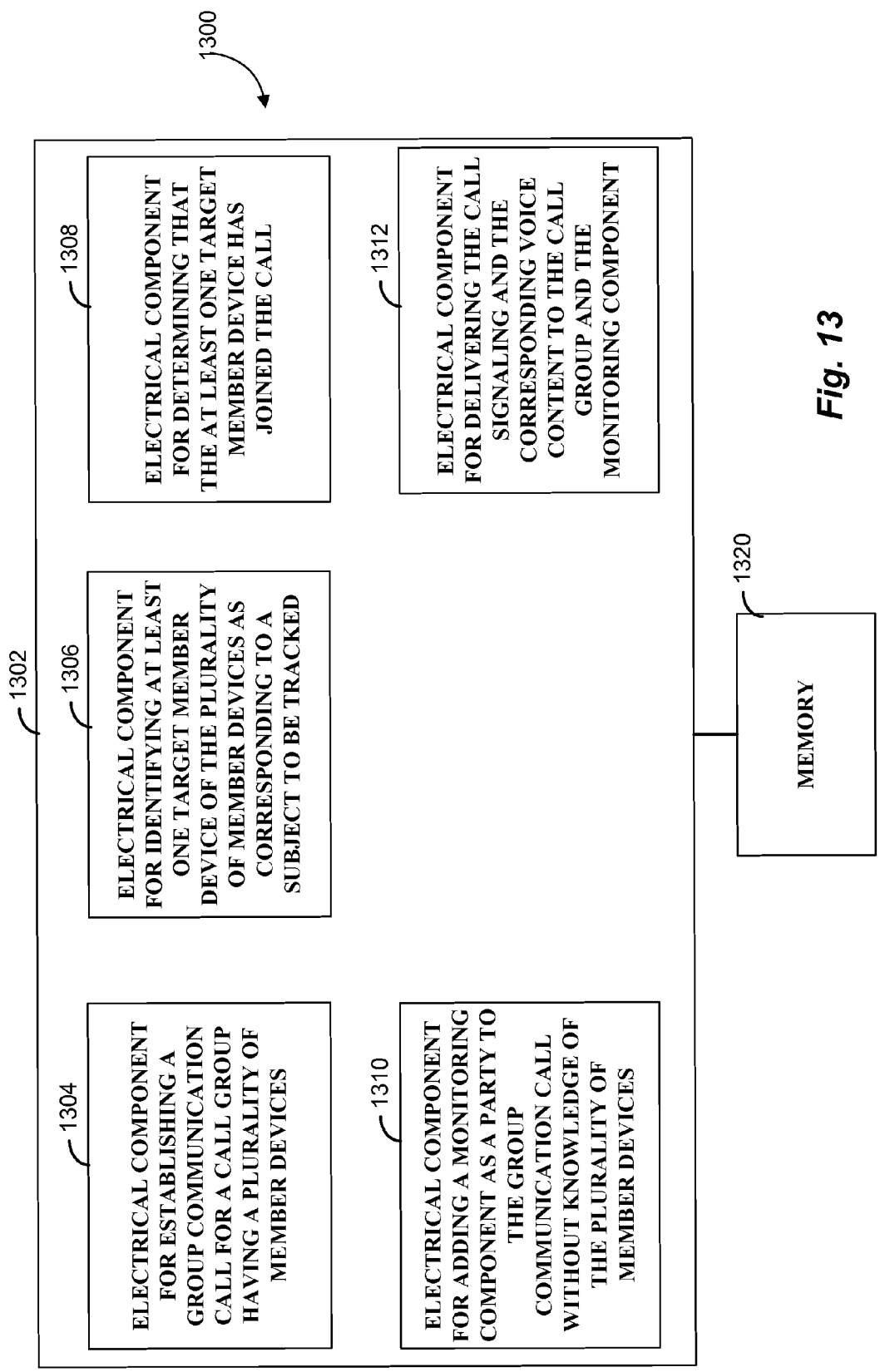
FIG. 13 depicts another system for reporting call information, in accordance with some disclosed aspects.

FIG. 13 depicts a system 1300 for reporting call information. For example, system 1300 can reside at least partially within a group communications server, such as regional group communications server 120 (FIG. 1). It is to be appreciated that system 1300 is represented as including functional blocks, which can be functional blocks that represent functions implemented by a computing platform, processor, software, or combination thereof such as firmware. System 1300 includes a logical grouping 1302 of electrical components that can act in conjunction. For instance, logical grouping 1302 can include an electrical component 1304 for establishing a group communication call for a call group having a plurality of member devices, wherein the group communication call comprises call signaling and corresponding voice content. Moreover, logical grouping 1302 can include an electrical component 1306 for identifying at least one target member device of the plurality of member devices as corresponding to a subject to be tracked. Further, logical grouping 1302 can include an electrical component 1308 for determining that the at least one target member device has joined the call. In addition, logical grouping 1302 can include an electrical component 1310 for adding a monitoring component as a party to the group communication call without knowledge of the plurality of member devices. Additionally, logical grouping 1302 can include an electrical component 1312 for delivering, based on the target member device joining the call, the call signaling and the corresponding voice content to the call group and the monitoring component. System 1300 can include a memory 1320 that retains instructions for executing functions associated with electrical components 1304-1312. While shown as being external to memory 1320, it is to be understood that one or more of electrical components 1304-1312 can exist within memory 1320.

Figure 14:
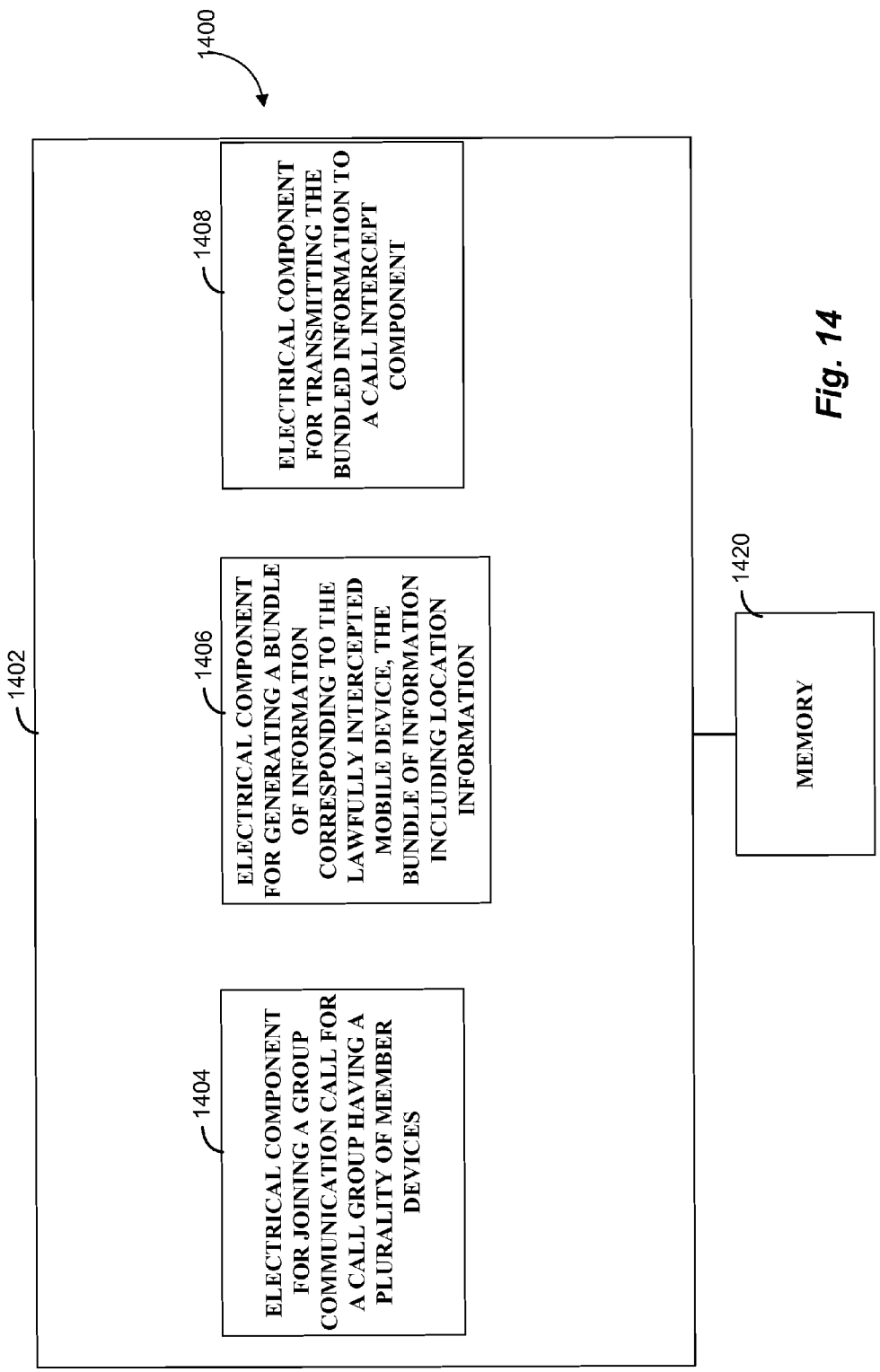
FIG. 14 depicts a system for providing call information, in accordance with some disclosed aspects.

FIG. 14 depicts a system 1400 for providing call information in a lawfully intercepted wireless device. For example, system 1400 can reside at least partially within a wireless device, such as wireless device 102 (FIG. 1). It is to be appreciated that system 1400 is represented as including functional blocks, which can be functional blocks that represent functions implemented by a computing platform, processor, software, or combination thereof such as firmware. System 1400 includes a logical grouping 1402 of electrical components that can act in conjunction. For instance, logical grouping 1402 can include an electrical component 1404 for joining a group communication call for a call group having a plurality of member devices. Moreover, logical grouping 1402 can include an electrical component 1406 for generating a bundle of information corresponding to the lawfully intercepted wireless device, the bundle of information including location information. Further, logical grouping 1402 can include an electrical component 1408 for transmitting the bundled information to a call intercept component. System 1400 can include a memory 1420 that retains instructions for executing functions associated with electrical components 1404-1408. While shown as being external to memory 1420, it is to be understood that one or more of electrical components 1404-1408 can exist within memory 1420.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method of reporting call information, comprising:
   establishing a group communication call for a call group having a plurality of member devices;
   identifying at least one target member device of the plurality of member devices as corresponding to a subject to be tracked;
   determining that the at least one target member device has joined the group communication call;
   obtaining a bundle of information corresponding to the at least one target member device;
   correlating the bundle of information with a corresponding portion of call signaling and corresponding voice content in real time, wherein the corresponding portion of the call signaling and the corresponding portion of the voice content comprise packetized data; and
   delivering, based on the at least one target member device joining the group communication call, the bundle of information and the corresponding portion of the call signaling and the corresponding voice content to a call intercept component across a same path to the call intercept component such that the corresponding portion of the call signaling and the corresponding portion of the voice content are received at the call intercept component at a same time.

2. The method of claim 1, wherein the bundle of information includes location information.

3. The method of claim 1, further comprising adding the call intercept component as a party to the group communication call without knowledge of the plurality of member devices.

4. The method of claim 1, wherein the call group comprises at least three members.

5. The method of claim 1, wherein delivering the call signaling and the corresponding voice content further comprises delivering from a single call intercept component.

6. The method of claim 1, further comprising:
storing initial location information corresponding to the at least one target member device;
obtaining subsequent location information corresponding to the at least one target member device; and
determining that the subsequent location information represents a new location relative to the initial location information,
wherein the correlating the bundle of information further comprises correlating and delivering the subsequent location information.

7. The method of claim 1, wherein establishing the group communication call further comprises initially hosting the group communication call for a first subset of the plurality of members devices not including the at least one target member device, and determining that the at least one target member device has joined the group communication call after a time period of hosting the group communication call for the first subset of the plurality of members devices.

8. The method of claim 1, further comprising transmitting call state information corresponding to the group communication call to the call intercept component.

9. The method of claim 8, wherein transmitting the call state information further comprises transmitting one or more of identification of member devices participating in the group communication call, identification of a member device having a floor for the group communication call, identification of a time period a member device maintaining the floor, identification of a member device joining the group communication call, or identification of a member device leaving the group communication call.

10. At least one processor configured to report call information, comprising:
a first module for establishing a group communication call for a call group having a plurality of member devices;
a second module for identifying at least one target member device of the plurality of member devices as corresponding to a subject to be tracked;
a third module for determining that the at least one target member device has joined the group communication call;
a fourth module for obtaining a bundle of information corresponding to the at least one target member device;
a fifth module for correlating the bundle of information with a corresponding portion of call signaling and corresponding voice content in real time, wherein the corresponding portion of the call signaling and the corresponding portion of the voice content comprise packetized data; and
a sixth module for delivering, based on the at least one target member device joining the group communication call, the bundle of information and the corresponding portion of the call signaling and the corresponding voice content to a call intercept component across a same path to the call intercept component such that the corresponding portion of the call signaling and the corresponding portion of the voice content are received at the call intercept component at a same time.

11. A computer program product, comprising:
a non-transitory computer-readable medium comprising:
a first set of codes for causing a computer to establish a group communication call for a call group having a plurality of member devices;
a second set of codes for causing the computer to identify at least one target member device of the plurality of member devices as corresponding to a subject to be tracked;
a third set of codes for causing the computer to determine that the at least one target member device has joined the group communication call;
a fourth set of codes for causing the computer to obtain a bundle of information corresponding to the at least one target member device;
a fifth set of codes for causing the computer to correlate the bundle of information with a corresponding portion of call signaling and corresponding voice content in real time, wherein the corresponding portion of the call signaling and the corresponding portion of the voice content comprise packetized data; and
a sixth set of codes for causing the computer to deliver, based on the at least one target member device joining the call, the bundle of information and the corresponding portion of the call signaling and the corresponding voice content to a call intercept component across a same path to the call intercept component such that the corresponding portion of the call signaling and the corresponding portion of the voice content are received at the call intercept component at a same time.

12. An apparatus, comprising:
means for establishing a group communication call for a call group having a plurality of member devices;
means for identifying at least one target member device of the plurality of member devices as corresponding to a subject to be tracked;
means for determining that the at least one target member device has joined the group communication call;
means for obtaining a bundle of information corresponding to the at least one target member device;
means for correlating the bundle of information with a corresponding portion of call signaling and corresponding voice content in real time, wherein the corresponding portion of the call signaling and the corresponding portion of the voice content comprise packetized data; and
means for delivering, based on the at least one target member device joining the group communication call, the bundle of information and the corresponding portion of the call signaling and the corresponding voice content to a call intercept component across a same path to the call intercept component such that the corresponding portion of the call signaling and the corresponding portion of the voice content are received at the call intercept component at a same time.

13. An apparatus, comprising:
at least one processor comprising:
a call setup component for establishing a group communication call for a call group having a plurality of member devices; and
a call hosting component for:
identifying a least one target member of the plurality of member devices as corresponding to a subject to be tracked, determining that the at least one target member device has joined the group communication call,
obtaining a bundle of information corresponding to the at least one target member device,
correlating the bundle of information with a corresponding portion of call signaling and corresponding voice content, wherein the corresponding portion of the call signaling and the corresponding portion of the voice content comprise packetized data, and delivering, based on the at least one target member device joining the group communication call, the bundle of information and the corresponding portion of the call signaling and the corresponding voice content to a call intercept component across a same path to the call intercept component such that the corresponding portion of the call signaling and the corresponding portion of the voice content are received at the call intercept component at a same time.

14. The apparatus of claim 13, wherein the bundle of information includes location information.

15. The apparatus of claim 13, wherein the call hosting function is further configured to add the call intercept component as a party to the group communication call without knowledge of the plurality of member devices.

16. A method of reporting call information, comprising:

establishing a group communication call for a call group having a plurality of member devices, wherein the group communication call comprises call signaling and corresponding voice content, and wherein the call signaling and the corresponding voice content comprise packetized data;

identifying at least one target member device of the plurality of member devices as corresponding to a subject to be tracked;

determining that the at least one target member device has joined the group communication call;

adding a call intercept component as a party to the group communication call without knowledge of the plurality of member devices;

delivering, based on the at least one target member device joining the group communication call, the call signaling and the corresponding voice content to the call group and the call intercept component across a same path to the call intercept component such that the call signaling and the corresponding voice content are received at the call intercept component at a same time;

obtaining location information corresponding to the at least one target member device; and correlating the location information with a corresponding portion of the call signaling and the corresponding voice content, wherein delivering the call signaling and the corresponding voice content further comprises delivering the location information with the corresponding portion of the call signaling and the corresponding voice content to the call intercept component.

17. At least one processor configured to report call information, comprising:

a first module for establishing a group communication call for a call group having a plurality of member devices, wherein the group communication call comprises call signaling and corresponding voice content, and wherein the call signaling and the corresponding voice content comprise packetized data;

a second module for identifying at least one target member device of the plurality of member devices as corresponding to a subject to be tracked;

a third module for determining that the at least one target member device has joined the group communication call;

a fourth module for adding a call intercept component as a party to the group communication call without knowledge of the plurality of member devices;

a fifth module for delivering, based on the at least one target member device joining the group communication call, the call signaling and the corresponding voice content to the call group and the call intercept component across a same path to the call intercept component such that the call signaling and the corresponding voice content are received at the call intercept component at a same time;

a sixth module for obtaining location information corresponding to the at least one target member device; and a seventh module for correlating the location information with a corresponding portion of the call signaling and the corresponding voice content, wherein delivering the call signaling and the corresponding voice content further comprises delivering the location information with the corresponding portion of the call signaling and the corresponding voice content to the call intercept component.

18. A computer program product, comprising:

a non-transitory computer-readable medium comprising:

a first set of codes for causing a computer to establish a group communication call for a call group having a plurality of member devices, wherein the group communication call comprises call signaling and corresponding voice content, and wherein the call signaling and the corresponding voice content comprise packetized data;

a second set of codes for causing the computer to identify at least one target member device of the plurality of member devices as corresponding to a subject to be tracked;

a third set of codes for causing the computer to determine that the at least one target member device has joined the group communication call;

a fourth set of codes for causing the computer to add a call intercept component as a party to the group communication call without knowledge of the plurality of member devices;

a fifth set of codes for causing the computer to deliver, based on the at least one target member device joining the group communication call, the call signaling and the corresponding voice content to the call group and the call intercept component across a same path to the call intercept component such that the call signaling and the corresponding voice content are received at the call intercept component at a same time;

a sixth set of codes for causing the computer to obtain location information corresponding to the at least one target member device; and a seventh set of codes for causing the computer to correlate the location information with a corresponding portion of the call signaling and the corresponding voice content, wherein delivering the call signaling and the corresponding voice content further comprises delivering the location information with the corresponding portion of the call signaling and the corresponding voice content to the call intercept component.

19. An apparatus, comprising:

means for establishing a group communication call for a call group having a plurality of member devices, wherein the group communication call comprises call signaling and corresponding voice content, and wherein the call signaling and the corresponding voice content comprise packetized data;

means for identifying at least one target member device of the plurality of member devices as corresponding to a subject to be tracked;
means for determining that the at least one target member device has joined the group communication call;
means for adding a call intercept component as a party to the group communication call without knowledge of the plurality of member devices;
means for delivering, based on the at least one target member device joining the group communication call, the call signaling and the corresponding voice content to the call group and the call intercept component across a same path to the call intercept component such that the call signaling and the corresponding voice content are received at the call intercept component at a same time;
means for obtaining location information corresponding to the at least one target member device; and
means for correlating the location information with a corresponding portion of the call signaling and the corresponding voice content,
wherein the means for delivering the call signaling and the corresponding voice content further comprises means for delivering the location information with the corresponding portion of the call signaling and the corresponding voice content to the call intercept component.

20. An apparatus, comprising:
at least one processor comprising:
a call setup component for establishing a group communication call for a call group having a plurality of member devices, wherein the group communication call comprises call signaling and corresponding voice content, and wherein the call signaling and the corresponding voice content comprise packetized data; and
a call hosting function for:
identifying at least one target member device of the plurality of member devices as corresponding to a subject to be tracked,
determining that the at least one target member device has joined the group communication call,
adding a call intercept component as a party to the group communication call without knowledge of the plurality of member devices,
delivering, based on the at least one target member device joining the group communication call, the call signaling and the corresponding voice content to the call group and the call intercept component across a same path to the call intercept component such that the call signaling and the corresponding voice content are received at the call intercept component at a same time,
obtaining location information corresponding to the at least one target member device, and
correlating the location information with a corresponding portion of the call signaling and the corresponding voice content,
wherein delivering the call signaling and the corresponding voice content further comprises delivering the location information with the corresponding portion of the call signaling and the corresponding voice content to the call intercept component.

21. A method of reporting call information, comprising:
establishing a group communication call for a call group having a plurality of member devices, wherein the group communication call comprises call signaling and corresponding voice content, and wherein the call signaling and the corresponding voice content comprise packetized data;
identifying at least one target member device of the plurality of member devices as corresponding to a subject to be tracked;
determining that the at least one target member device has joined the group communication call; and
delivering the call signaling and the corresponding voice content across a same path to a call intercept component such that the call signaling and the corresponding voice content are received at the call intercept component at a same time.

22. At least one processor configured to report call information, comprising:
a first module for establishing a group communication call for a call group having a plurality of member devices, wherein the group communication call comprises call signaling and corresponding voice content, and wherein the call signaling and the corresponding voice content comprise packetized data;
a second module for identifying at least one target member device of the plurality of member devices as corresponding to a subject to be tracked;
a third module for determining that the at least one target member device has joined the group communication call; and
a fourth module for delivering the call signaling and the corresponding voice content across a same path to a call intercept component such that the call signaling and the corresponding voice content are received at the call intercept component at a same time.

23. A computer program product, comprising:
a non-transitory computer-readable medium comprising:
a first set of codes for causing a computer to establish a group communication call for a call group having a plurality of member devices, wherein the group communication call comprises call signaling and corresponding voice content, and wherein the call signaling and the corresponding voice content comprise packetized data;
a second set of codes for causing the computer to identify at least one target member device of the plurality of member devices as corresponding to a subject to be tracked;
a third set of codes for causing the computer to that the at least one target member device has joined the group communication call; and
a fourth set of codes for causing the computer to deliver the call signaling and the corresponding voice content across a same path to a call intercept component such that the call signaling and the corresponding voice content are received at the call intercept component at a same time.

24. An apparatus, comprising:
means for establishing a group communication call for a call group having a plurality of member devices, wherein the group communication call comprises call signaling and corresponding voice content, and wherein the call signaling and the corresponding voice content comprise packetized data;
means for identifying at least one target member device of the plurality of member devices as corresponding to a subject to be tracked;
means for determining that the at least one target member device has joined the group communication call; and
means for delivering the call signaling and the corresponding voice content across a same path to a call intercept component such that the call signaling and the corresponding voice content are received at the call intercept component at a same time.

25. An apparatus, comprising:
at least one processor comprising:
    a call setup component for establishing a group communication call for a call group having a plurality of member devices, wherein the group communication call comprises call signaling and corresponding voice content, and wherein the call signaling and the corresponding voice content comprise packetized data; and
    a call hosting function for identifying at least one target member device of the plurality of member devices as corresponding to a subject to be tracked, determining that the at least one target member device has joined the group communication call, and delivering the call signaling and the corresponding voice content across a same path to a call intercept component such that the call signaling and the corresponding voice content are received at the call intercept component at a same time.

26. A method of providing call information in a lawfully intercepted wireless device, comprising:
    joining a group communication call for a call group having a plurality of member devices;
    generating a bundle of information corresponding to the lawfully intercepted wireless device, the bundle of information including location information and call signaling information, and the call signaling information comprising packetized data; and
    transmitting the bundle of information to a call intercept component across a same path such that the bundle of information is received at the call intercept component at a same time.

27. The method of claim 26, further comprising:
    overriding a privacy setting to generate and transmit the bundle of information when the privacy setting prohibits disclosing the location information.

28. At least one processor configured to provide call information in a lawfully intercepted wireless device, comprising:
    a first module for joining a group communication call for a call group having a plurality of member devices;
    a second module for generating a bundle of information corresponding to the lawfully intercepted wireless device, the bundle of information including location information and call signaling information, and the call signaling information comprising packetized data; and
    a third module for transmitting the bundle of information to a call intercept component across a same path such that the bundle of information is received at the call intercept component at a same time.

29. A computer program product, comprising:
a non-transitory computer-readable medium comprising:
    a first set of codes for causing a computer to join a group communication call for a call group having a plurality of member devices;
    a second set of codes for causing the computer to generate a bundle of information corresponding to a lawfully intercepted wireless device, the bundle of information including location information and call signaling information, and the call signaling information comprising packetized data; and
    a third set of codes for causing the computer to transmit the bundle of information to a call intercept component across a same path such that the bundle of information is received at the call intercept component at a same time.

30. An apparatus, comprising:
means for joining a group communication call for a call group having a plurality of member devices;
means for generating a bundle of information corresponding to a lawfully intercepted wireless device, the bundle of information including location information and call signaling information, and the call signaling information comprising packetized data; and
means for transmitting the bundle of information to a call intercept component across a same path such that the bundle of information is received at the call intercept component at one same time.

31. An apparatus, comprising:
at least one processor comprising:
    a call processing component for joining a group communication call for a group call having a plurality of member devices, generating a bundle of information corresponding to a lawfully intercepted wireless device, the bundle of information including location information and call signaling information, and the call signaling information including packetized data, and transmitting the bundle of information to a call intercept component across a same path such that the bundle of information is received at the call intercept component at a same time.

32. A method of monitoring call information, comprising:
    transmitting an authorization to a monitoring component, the authorization providing identifying information for one or more monitoring targets;
    receiving a notification that a group call including at least one monitoring target has been established; and
    receiving call signaling and corresponding voice content associated with the group call across a same path such that the call signaling and the corresponding voice content are received at a same time, wherein the call signaling and the corresponding voice content comprise packetized data.

33. The method of claim 32, wherein the call signaling and the corresponding voice content are received in a sequence of occurrence.

* * * * *